United States Patent [19]

Coy

[11] Patent Number: 5,425,198
[45] Date of Patent: Jun. 20, 1995

[54] AUTOMATIC POTTED PLANT WATERER

[76] Inventor: Gerald R. Coy, 4485 South Blvd. NW., Canton, Ohio 44718

[21] Appl. No.: 177,774

[22] Filed: Jan. 4, 1994

[51] Int. Cl.$^6$ .............................................. A01G 9/00
[52] U.S. Cl. ........................................... 47/18; 47/79
[58] Field of Search .................. 119/74; 47/79, 18, 81

[56] References Cited

U.S. PATENT DOCUMENTS

| | | |
|---|---|---|
| 3,783,555 | 1/1974 | Peters . |
| 3,800,471 | 4/1974 | Adams . |
| 4,829,709 | 5/1989 | Centafanti . |
| 5,010,687 | 4/1991 | Hougard . |
| 5,174,062 | 12/1992 | Kim . |

FOREIGN PATENT DOCUMENTS

| | | | |
|---|---|---|---|
| 1473290 | 3/1967 | France | 47/79 V |
| 2394242 | 2/1979 | France | 47/79 V |
| 2446592 | 9/1980 | France | 47/79 V |
| 2452874 | 10/1980 | France | 47/18 |
| 837332 | 9/1949 | Germany | 47/79 V |
| 720949 | 12/1954 | United Kingdom | 47/79 V |

*Primary Examiner*—Henry E. Raduazo

[57] ABSTRACT

A device for automatically watering potted type plants has a shallow reservoir base/tray capable of holding water and also capable of supporting at least one previously potted plant and also capable of supporting an inverted container (such as a typical screw top jar turned upside down) for containing additional water (and/or other plant nutrients). A specially adapted support base is used to keep the bottom of the inverted container (where the opening is located) slightly above the bottom of the base/tray. The base/tray can have ribs or rails to keep the potted plant raised slightly above the lowest part of the tray (but lower than the opening in the inverted container). The water container has a detachable lid with a hole. The detachable lid is attached to the water filled container (not yet inverted) and the lid and container are fixed to the base/tray while the hole is covered by the plant owner's finger creating a partial vacuum in the water container such that water will only flow from the water container when the water level in the tray/base drops below the level of the inverted container opening.

6 Claims, 3 Drawing Sheets

AUTOMATIC POTTED PLANT WATERER

BACKGROUND OF THE INVENTION

1. Field of the Invention

The present invention relates generally to house plants, and more particularly, to a device especially adapted to automatically water previously potted plants for extended periods of time.

2. Description of the Prior Art

House plants are commonly used to add depth and beauty to the decor of a home. However, when homeowners maintain a large number of plants, they want to protect their investment, even when they go on vacation. Often this means asking a neighbor, friend, or relative to come in and water the plants for them. Homeowners cannot be certain, however, that their plants are receiving the amount of water they need in the homeowner's absence. The plants may not get enough water or they may suffer from being overwatered by an overly zealous caretaker. Yet, homeowners cannot just leave the plants for an extended period of time without any care.

In the past, attempts have been made to produce specially adapted flower pots which automatically water the contained plants for an extended period of time using self-contained reservoirs or other means (see for example the following U.S. Pat. Nos.: 3,783,555; 3,800,471; 4,829,709; 5,010,687; and U.S. Pat. No. 5,174,062).

Thus, while the foregoing body of prior art indicates it to be well known to use specially adapted automatically watering pots into which plants can be replanted, the provision of a more simple and cost effective device is not contemplated. Nor does the prior art described above teach or suggest an automatic plant watering device which may be used by individuals to water previously potted plants without having to replant them in a new pot. The foregoing disadvantages are overcome by the unique automatic plant waterer of the present invention as will be made apparent from the following description thereof. Other advantages of the present invention over the prior art also will be rendered evident.

SUMMARY OF THE INVENTION

To achieve the foregoing and other advantages, the present invention, briefly described, provides a device for automatically watering potted type plants having a shallow reservoir base/tray capable of holding water and also capable of supporting at least one previously potted plant (previously potted in the common type of pot having a hole in the bottom) and also capable of supporting an inverted container (such as a typical screw top jar turned upside down) for containing additional water (and/or other plant nutrients). A specially adapted support base is used to keep the bottom of the inverted container (where the opening is located) slightly above the bottom of the base/tray. The base/tray can have ribs or rails to keep the potted plant raised slightly above the lowest part of the tray (but lower than the opening in the inverted container). The water container has a detachable lid with a hole. The detachable lid is attached to the water filled container (not yet inverted) and the lid and container are fixed to the base/tray while the hole is covered with a finger creating a partial vacuum in the water container such that water will only flow from the water container when the water level in the tray/base drops below the level of the inverted container opening.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will form the subject matter of the claims appended hereto.

In this respect, before explaining the preferred embodiments of the invention in detail, it is to be understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which this disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms of phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new automatic plant watering device which has all of the advantages of the prior art and none of the disadvantages.

It is another object of the present invention to provide a new automatic plant watering device which may be easily and efficiently manufactured and marketed.

It is a further objective of the present invention to provide a new automatic plant watering device which is of durable and reliable construction.

An even further object of the present invention is to provide a new automatic plant watering device which is susceptible of a low cost of manufacture with regard to both materials and labor, and which accordingly is then susceptible of low prices of sale to the consuming public, thereby making such automatic plant watering device available to the buying public.

Still yet a further object of the present invention is to provide a new automatic plant watering device which is able to automatically keep a previously potted plant watered for an extended period of time.

It is still a further object of the present invention to provide a new automatic plant watering device having a shallow reservoir base/tray capable of holding water and also capable of supporting at least one previously potted plant (previously planted in the common type of pot having a hole in the bottom) and also capable of supporting an inverted container (such as a screw top jar turned upside down) for containing water (and/or other plant nutrients).

Still a further object of the present invention is to provide a new automatic plant watering device including a specially adapted support base for keeping the bottom of the inverted container (where the opening is located) slightly above the bottom of the base/tray.

Even still a further object of the present invention is to provide ribs or rails to keep a potted plant raised slightly above the lowest part of a support tray (but lower than the opening in the inverted container).

Yet even still a further object of the present invention is to provide for a water container a detachable lid with a hole such that the detachable lid can be attached to the filled container and then fixed to the base/tray while the hole is covered with a finger creating a partial vacuum in the water container such that water will only flow from the water container when the water level in the tray/base drops below the level of the inverted container opening.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawings wherein.

DESCRIPTION OF THE PREFERRED EMBODIMENT

With reference now to the drawings, a new automatic plant watering device embodying the principles and concepts of the present invention will be described.

Figure 1:
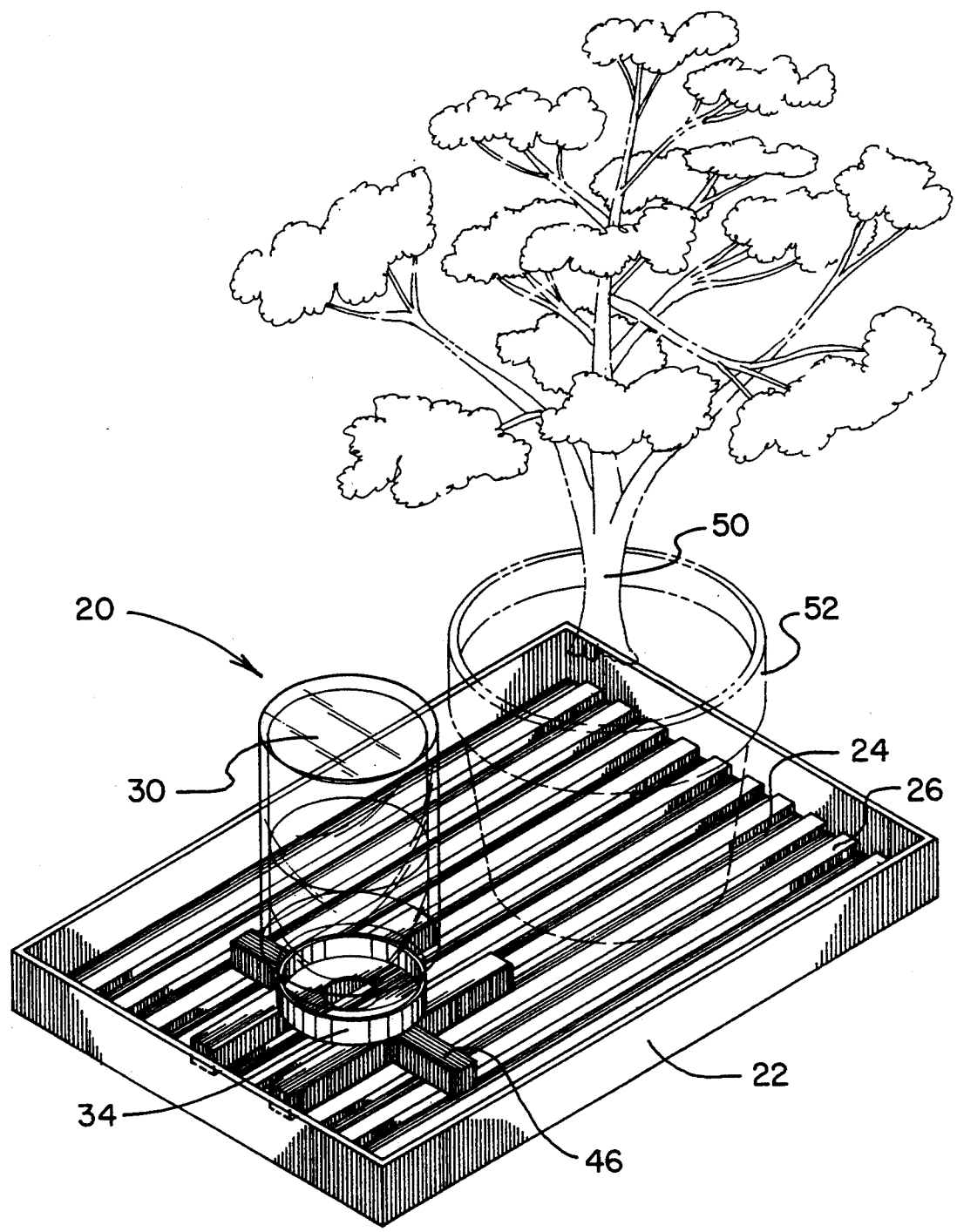
FIG. 1 is a perspective view showing the first preferred embodiment of the automatic plant watering device of the invention, along with a superimposed previously potted plant to be watered.

Turning initially to FIG. 1, there is shown a first exemplary embodiment of the automatic plant watering device of the invention generally designated by reference numeral 20. In its preferred form, automatic plant watering device 20 comprises generally a tray-like base (or reservoir) 22, a water container 30 and a stand (or support) 46 for the container 30. The reservoir 22 is preferably made from a relatively hard plastic material. The water container 30 is preferably made of glass (for example a glass jar can be used) with a preferably plastic cap (or lid) 34. The stand 46 is preferably made of a plastic material. Of course any other suitable materials or combinations thereof could be used for any of the components of the invention and should be considered within the scope of the invention (for examples, the reservoir 22 could alternatively be made of wood, metal, or ceramic (clay) materials; the water container 30 could be made of plastic, metal or ceramic materials; and the cap 34 could be made of metal or rubber materials).

The reservoir 22 has a bottom 24 on which can be formed ribs or rails 26 (preferably integrally molded with the reservoir 22).

Figure 2:
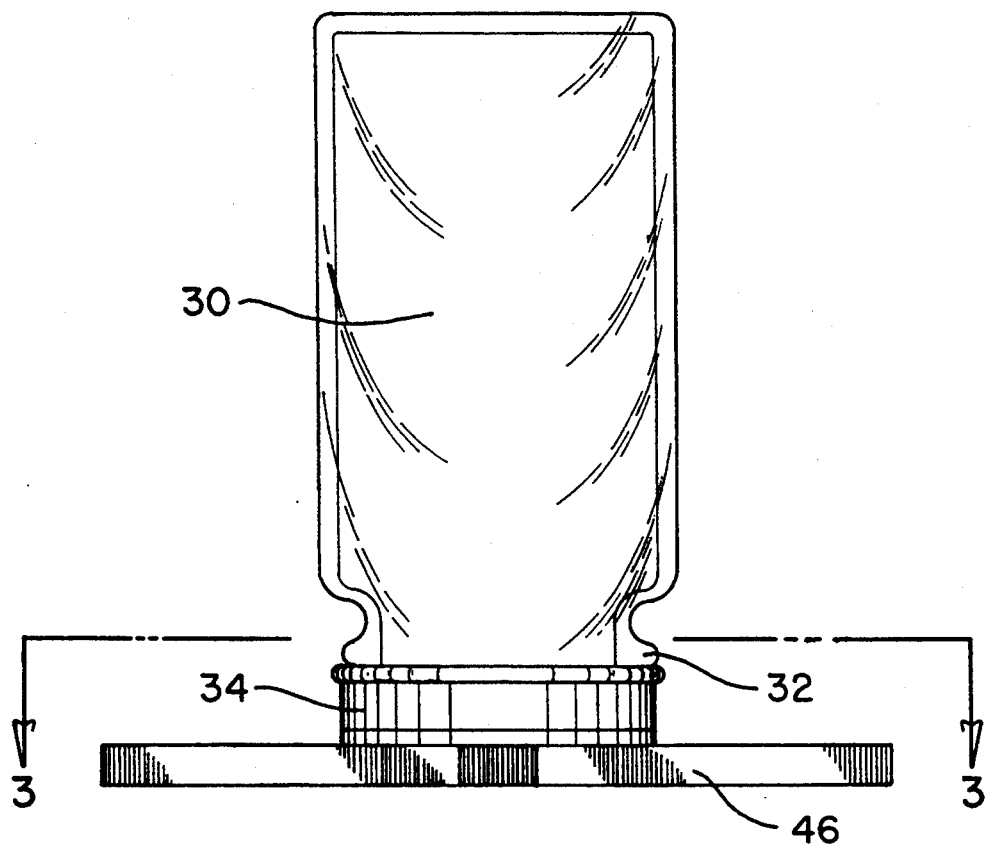
FIG. 2 is a side perspective view of the water container part and its support for use as part of the first embodiment of the present invention automatic plant watering device of FIG. 1.
Figure 3:
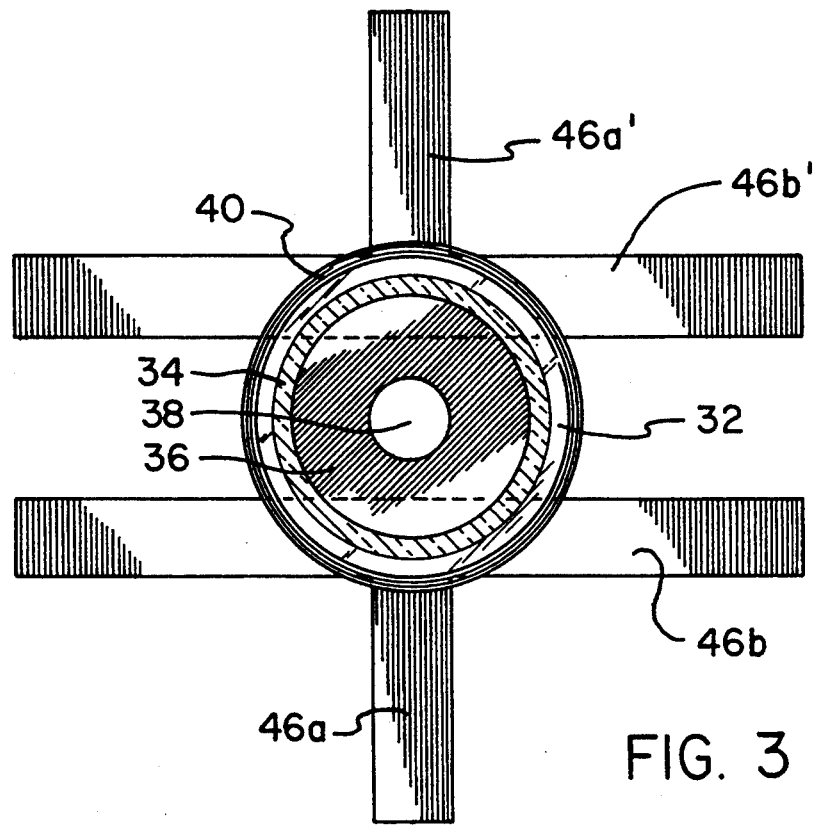
FIG. 3 is a cross-sectional top view of the water container part and support therefore of the automatic plant watering device of FIG. 2 taken along line 3—3 thereof.

Referring now to FIGS. 1-3, and particularly 2 and 3, the water container 30, which is open at one end (the bottom end as the container 30 is shown in FIGS. 1 and 2), preferably has a threaded area (covered by the cap 34 in the Figures) immediately below adjacent area 32. The threaded end of the water container 30 can be tightly fitted into correspondingly threaded water container cap 34 (alternatively the cap 34 could snap onto the container 30). Preferably centrally located in the bottom 36 of the cap 34 is a small hole 38 which could easily be covered by the end of a person's finger. The rim 40 of the cap 34 extends slightly outward as shown in FIG. 2. A sealing means can alternatively be used to prevent leakage between the cap 34 and the container 32.

A container support 46 is used to keep the opening of the container 30 (and the cap 34) raised above the floor 24 and above the ribs 26 of the reservoir 22. The support 46 is preferably made with a first rail 46a perpendicularly intersected by a first cross rail 46b and a second rail 46a' perpendicularly intersected by a second cross rail 46b'. In the preferred embodiment the cap 34 is permanently mounted onto the support 46.

Use of the automatic watering device 20 of the present invention is very simple. When a plant owner will not be able to hand water their plant for an extended period of time (or if the plant owner just doesn't want to worry about watering the plant) the plant owner can set the automatic watering device 20 on a flat surface. A plant such as that represented by reference numeral 50 in a pot (of the type having a hole in the bottom) such as that represented by reference numeral 52 is placed onto the ribs 24 of the device 20. The reservoir 22 can be filled with water (this could of course be done before placing the plant on the ribs 24). Next, the cap 34 and the stand 46 to which it is attached are screwed onto the open end of container 30 (which is right side up and filled with water and/or other plant nutrients). The plant owner's finger is used to cover the small hole 38 in the cap 34 and the container 30 (and attached cap 34 and stand 46) is turned upside down, the owner's finger preventing the water from pouring out of the hole 38. The stand 46 is placed down in the water in the reservoir 22 and is placed against the ribs 26 of the reservoir 22. Once the stand 46 (with attached container and cap 34) is positioned, the hole 38 in the cap should be below the water level in the reservoir 22. A partial vacuum is formed in the container 30 which prevents the water from flowing out of the hole 38 until the water in the reservoir 22 drops below the bottom of the cap 34. Once the water level drops to a level immediately below the level of the cap 34, water will exit the container 30 through the hole 38 in the cap 34 to keep the level right at the cap 34 level until the container 30 is empty. Thus the plant 50 can be provided with water for an extended period of time.

Figure 4:
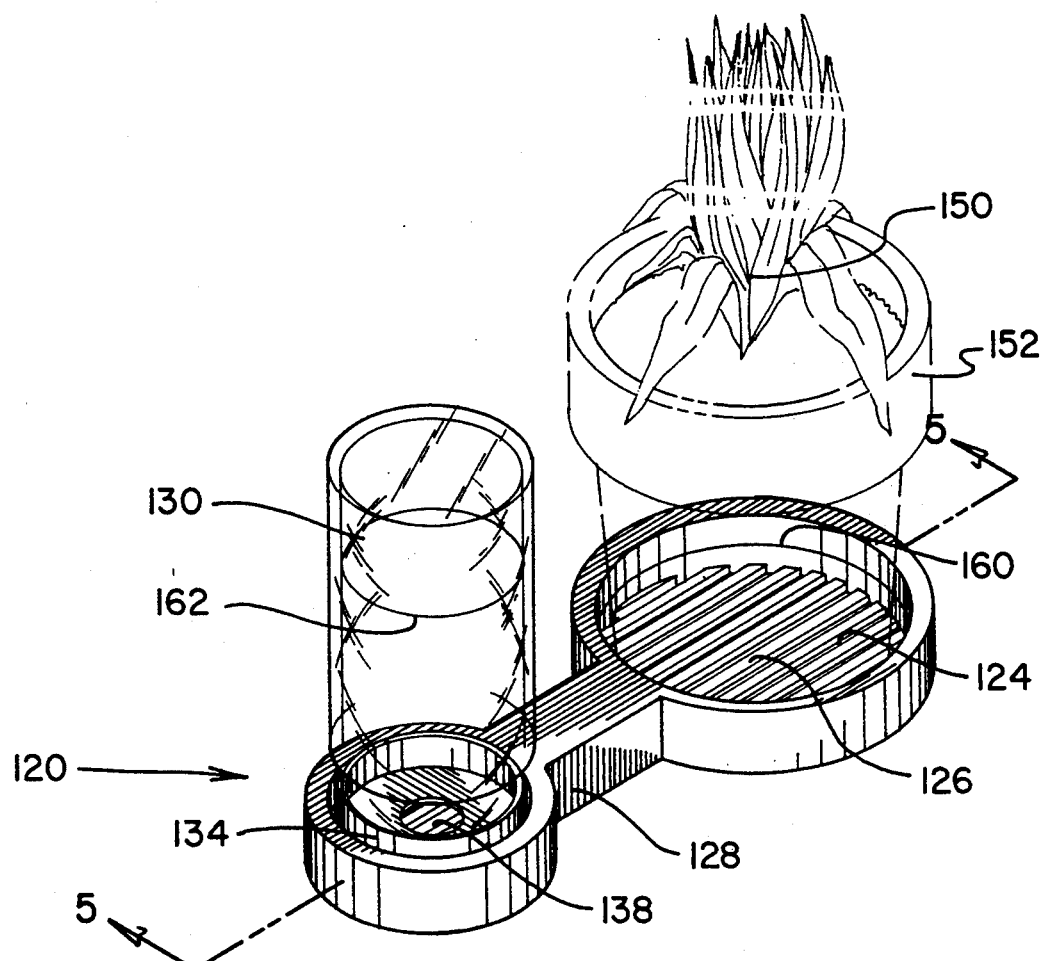
FIG. 4 is a perspective view in elevation of a second preferred embodiment of the present invention.
Figure 5:
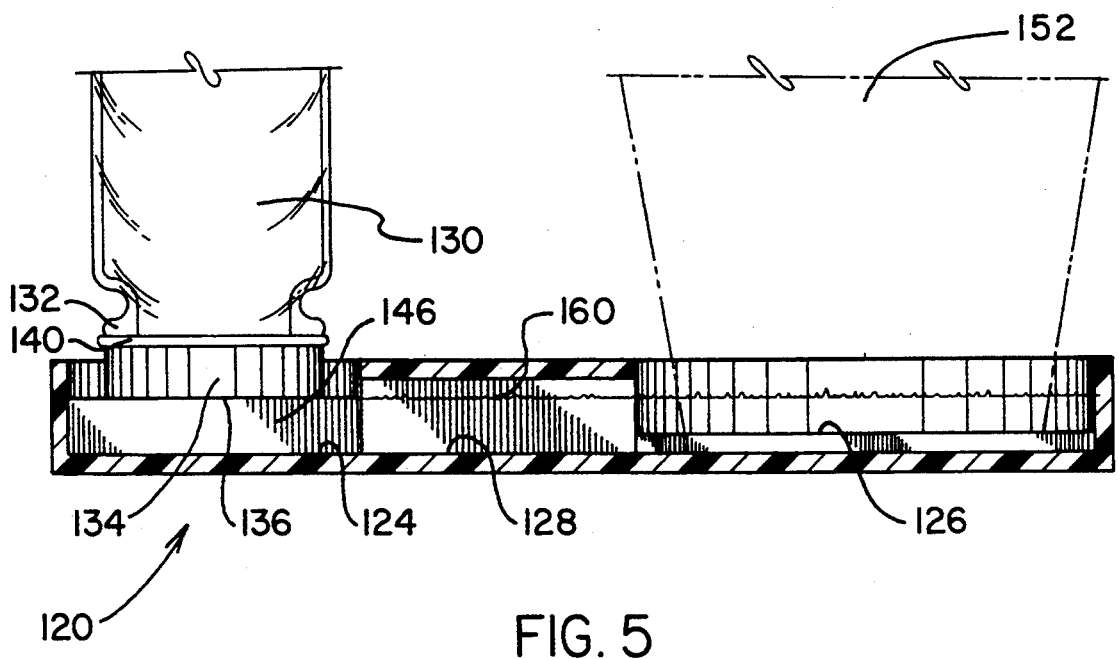
FIG. 5 is a partial cross-sectional side view in elevation of the second preferred embodiment of the present invention taken along 5—5 of FIG. 4.

A second embodiment automatic plant watering device 120 which is constructed to minimize evaporation is shown in FIGS. 4 and 5. Short ribs or rails 126 rise above the floor 124 in the plant area of the device 120 while higher ribs or rails 146 rise above the floor 124 of the water container area of the device 120. The short ribs 126 are similar to the ribs 26 of the first embodiment while the higher ribs serve a similar purpose as the stand 46 of the first embodiment (to keep the bottom of the water container above the bottom of the plant pot).

Instead of an open reservoir like the first embodiment, a closed water tunnel 128 lets water flow from the area underneath the container 130 to the area underneath the plant 150 pot 152 to minimize evaporation.

The water container 130 can be identical to the container 30 of the first embodiment. However, the water container cap 134 is preferably shaped to snugly fit above the ribs 146 in the container area of the device 120. As in the first embodiment, a small hole 138 is located in the middle of the bottom of the cap 136.

Use of the second embodiment automatic watering device 120 of the present invention is very similar to the use of the first embodiment. The plant owner sets the automatic watering device 120 on a flat surface. A plant 150 in a pot 152 (of the type having a hole in the bottom) is placed onto the ribs 124 of the device 120. Water is poured into the device 120 to bring the water up to a level similar to the water level 160 shown in the Figures. Next, the cap 134 is screwed onto the open end of container 130 (which is right side up and filled with water and/or other plant nutrients). The plant owner's finger is used to cover the small hole 138 in the cap 134 and the container 130 (and attached cap 134) is turned upside down, the owner's finger preventing the water from pouring out of the hole 138. The cap 134 is placed down in the water to tightly fit in the container area of the device 120 and is placed against the ribs 146). Once the cap 134 (and attached water container 130) is positioned, the hole 138 in the cap 134 should be below the water level 160. A partial vacuum is formed in the container 130 which prevents the water from flowing out of the hole 138 until the water level 160 drops below the bottom of the cap 134. Once the water level 160 drops to the level of the cap 134, water will exit the container 130 through the hole 138 in the cap 134 to keep the level right at the cap 134 level until the container 130 is empty. Thus the plant 150 can be provided with water for an extended period of time.

It is apparent from the above that the present invention accomplishes all of the objectives set forth by providing a new device for automatically watering, over an extended period of time, a plant previously potted in a pot of the type having a hole in the bottom, the device comprising: a shallow reservoir means able to hold water and/or other plant nutrients, the reservoir means able to support the previously potted plant; a containing means for containing water and/or other plant nutrients, the containing means at least partially open at one end; a cap means having a small hole, the cap adapted to engage with the containing means over the at least partially open end; means for supporting the containing means covered by the cap means in an inverted position slightly above the bottom of the shallow reservoir; whereby water contained in the containing means will automatically be added to the water in the reservoir means when the water level in the reservoir means drops below the level of the small hole in the cap. Ribs can be provided on the bottom of the reservoir to keep the plant pot slightly above the lowest part of the reservoir. The container means can be an open mouth glass jar. The reservoir means can be comprised of plastic material.

With respect to the above description, it should be realized that the optimum dimensional relationships for the parts of the invention, to include variations in size, materials, shape, form, function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as encompass all such modifications and equivalents.

What is claimed as being new and desired to be protected by LETTERS PATENT of the United States is as follows:

1. An automatic plant waterer for automatically watering a plant potted in a pot having a hole in the bottom, the automatic plant waterer comprising:
   a shallow reservoir means for holding water and for supporting the potted plant, the shallow reservoir means comprising a plastic tray and including ribs extending along a bottom of the tray for spacing the pot above the bottom of the tray;
   a container means for containing water, the container means comprising an open mouth glass jar being open at one end;
   a cap having a cap hole extending therethrough, the cap being engaged with the container means so as to extend over the open end thereof;
   means for supporting the container means covered by the cap in an inverted position and spaced above the bottom of said shallow reservoir means, wherein water can be positioned within the container means for automatic addition to the shallow reservoir means in response to a water level in the shallow reservoir means dropping below the cap hole, the means for supporting the container means comprising first and second spaced rails, a third rail joined to the first rail and extending orthogonally away from the first and second rails, and a fourth rail joined to the second rail and extending orthogonally and in an opposite direction from the third rail, the first and second rails defining top surfaces thereof, respectively, with the top surfaces being raised above the bottom of the reservoir means, and the cap being affixed to at least one of the rail top surfaces in an inverted position such that the container means extends above the top surfaces of the first and second rails, wherein the cap hole is positioned between the first and second rails.

2. The automatic plant waterer of claim 1, wherein the first and second rails are oriented parallel to one another, and further wherein the third and fourth rails are aligned co-linearly relative to one another.

3. An automatic plant waterer for automatically watering a plant potted in a pot having a hole in the bottom, the automatic plant waterer comprising:

a reservoir means having a bottom surface, the reservoir means being operable for holding water and for supporting the potted plant in a spaced relationship relative to the bottom surface;

a container means for containing a fluid, the container means having an open end;

a cap having a cap hole extending therethrough, the cap being removably coupled to the container means so as to extend across the open end thereof;

support means for supporting the container means covered by the cap in an inverted position and spaced above the bottom of the reservoir means and for permitting closure of the cap hole by a digit of a human hand, wherein water can be positioned within the container means for automatic addition to the reservoir means in response to a water level in the reservoir means dropping below the hole in the cap, the support means comprising first and second spaced rails extending in a substantially spaced orientation relative to one another, each of the rails having opposed upper and lower surfaces, with the cap being coupled to the upper surface of the rails such that the cap hole is positioned between the rails to permit a digit of a human hand to be positioned over the cap hole to preclude fluid communication therethrough during inversion and positioning of the support means and the container means with the cap attached thereto into an inverted position within the reservoir means.

4. The automatic plant waterer of claim 3, and further comprising a third rail joined to the first rail and extending outwardly therefrom; and a fourth rail joined to the second rail and extending outwardly therefrom, the third and fourth rails extending in opposed directions relative to one another.

5. The automatic plant waterer of claim 4, wherein the first and second rails extend in a substantially spaced and parallel orientation relative to one another; and further wherein the third rail projects substantially orthogonally from the first rail, and the fourth rail projects substantially orthogonally from the second rail.

6. A method of watering a plant comprising the steps of:

providing the automatic plant waterer of claim 3;

providing a plant potted in a pot having a hole in the bottom;

positioning a volume of water within the reservoir means;

positioning the potted plant within the reservoir;

positioning a volume of water within the container means;

positioning a digit of a human hand between the first and second rails and over the cap hole to preclude fluid communication therethrough;

inverting the container means having the cap and support means attached thereto;

positioning the support means into the reservoir means;

removing the digit of the human hand from over the cap hole to permit fluid communication between the container means and the reservoir means.

* * * * *